(12) United States Patent
Rhine et al.

(10) Patent No.: US 9,434,831 B2
(45) Date of Patent: Sep. 6, 2016

(54) BENZIMIDAZOLE BASED AEROGEL MATERIALS

(71) Applicant: Aspen Aerogels, Inc., Northborough, MA (US)

(72) Inventors: Wendell E Rhine, Belmont, MA (US); David Mihalcik, Northborough, MA (US)

(73) Assignee: ASPEN AEROGELS, INC., Northborough, MA (US)

( * ) Notice: Subject to any disclaimer, the term of this patent is extended or adjusted under 35 U.S.C. 154(b) by 114 days.

(21) Appl. No.: 14/450,942

(22) Filed: Aug. 4, 2014

(65) Prior Publication Data

US 2016/0032072 A1   Feb. 4, 2016

Related U.S. Application Data

(60) Provisional application No. 61/899,589, filed on Nov. 4, 2013.

(51) Int. Cl.
    *C08J 9/20*      (2006.01)
    *C08J 9/28*      (2006.01)

(52) U.S. Cl.
    CPC ........... *C08J 9/28* (2013.01); *C08J 2201/0502* (2013.01); *C08J 2205/026* (2013.01); *C08J 2379/04* (2013.01)

(58) Field of Classification Search
    None
    See application file for complete search history.

(56) References Cited

U.S. PATENT DOCUMENTS

| | | | |
|---|---|---|---|
| 2,188,007 A | 1/1940 | Kistler | |
| 3,174,947 A | 3/1965 | Marvel et al. | |
| 3,549,603 A | 12/1970 | Chenevey et al. | |
| 3,699,038 A | 10/1972 | Broom | |
| 3,708,439 A | 1/1973 | Sayigh et al. | |
| 3,737,042 A | 6/1973 | Broom | |
| 3,763,107 A * | 10/1973 | D'Alelio | C08G 73/18 524/597 |
| 3,841,492 A | 10/1974 | Brinegar | |
| 4,363,738 A | 12/1982 | Kummermehr | |
| 4,447,345 A | 5/1984 | Kummermehr et al. | |
| 4,512,894 A | 4/1985 | Wang | |
| 4,619,908 A | 10/1986 | Cheng et al. | |
| 4,628,067 A * | 12/1986 | Chen, Sr. | B01D 71/62 521/25 |
| 4,667,417 A | 5/1987 | Graser et al. | |
| 4,717,708 A | 1/1988 | Cheng et al. | |

(Continued)

OTHER PUBLICATIONS

Shen et al. "Highly Thermally Resistant and Flexible Polyimide Aerogels Containing Rigid-rod Biphenyl, Benzimidazole, and Triphenylpyridine Moieties: Synthesis and Characterization" Chem. Lett. 2013, 42, 1545-1547.*

*Primary Examiner* — Robert S Loewe
(74) *Attorney, Agent, or Firm* — Mark Hanson; Poongunran Muthukumaran

(57) ABSTRACT

The present invention provides aerogel materials based on imidazoles and polyimidazoles. The polyimidazole based aerogel materials can be thermally stable up to 500° C. or more, and can be carbonized to produce a carbon aerogel having a char yield of 60% or more, specifically 70% or more. The present invention also provides methods of producing polyimidazole based aerogel materials by reacting at least one monomer in a suitable solvent to form a polybenzimidazole gel precursor solution, casting the polybenzimidazole gel precursor solution into a fiber reinforcement phase, allowing the at least one gel precursor in the precursor solution to transition into a gel material, and drying the gel materials to remove at least a portion of the solvent, to obtain an polybenzimidazole-based aerogel material.

33 Claims, 1 Drawing Sheet

(56) References Cited

U.S. PATENT DOCUMENTS

| | | | |
|---|---|---|---|
| 5,275,796 A | 1/1994 | Tillotson et al. | |
| 5,306,555 A | 4/1994 | Ramamurthi et al. | |
| 5,508,376 A | 4/1996 | Dang et al. | |
| 5,536,562 A | 7/1996 | Tran et al. | |
| 5,565,142 A | 10/1996 | Deshpande et al. | |
| 5,656,195 A * | 8/1997 | Mielke | C04B 14/064 106/38.3 |
| 5,672,389 A | 9/1997 | Tran et al. | |
| 5,786,059 A | 7/1998 | Frank et al. | |
| 5,789,075 A | 8/1998 | Frank et al. | |
| 5,830,387 A | 11/1998 | Yokogawa et al. | |
| 5,866,027 A | 2/1999 | Frank et al. | |
| 5,962,539 A | 10/1999 | Perrut et al. | |
| 5,972,254 A | 10/1999 | Sander | |
| 5,973,015 A | 10/1999 | Coronado et al. | |
| 6,011,123 A * | 1/2000 | Kurosawa | C08G 77/455 257/E21.259 |
| 6,068,882 A | 5/2000 | Ryu | |
| 6,080,475 A | 6/2000 | Frank et al. | |
| 6,083,619 A | 7/2000 | Frank et al. | |
| 6,087,407 A | 7/2000 | Coronado et al. | |
| 6,140,377 A | 10/2000 | Schwertfeger et al. | |
| 6,187,250 B1 | 2/2001 | Champagne | |
| 6,197,270 B1 | 3/2001 | Sonada et al. | |
| 6,479,416 B1 | 11/2002 | Frank et al. | |
| 6,620,355 B1 | 9/2003 | Schmidt | |
| 6,623,639 B2 | 9/2003 | Barss et al. | |
| 6,656,527 B1 | 12/2003 | Gessner et al. | |
| 6,670,402 B1 | 12/2003 | Lee et al. | |
| 6,887,563 B2 | 5/2005 | Frank et al. | |
| 6,955,853 B1 | 10/2005 | Tran et al. | |
| 6,986,844 B2 | 1/2006 | Barss et al. | |
| 6,989,123 B2 | 1/2006 | Lee et al. | |
| 7,078,359 B2 | 7/2006 | Stepanian et al. | |
| 7,399,439 B2 | 7/2008 | Lee et al. | |
| 7,504,346 B2 | 3/2009 | Stepanian et al. | |
| 7,704,422 B2 | 4/2010 | Wang | |
| 7,780,890 B2 | 8/2010 | Lee et al. | |
| 7,919,024 B2 | 4/2011 | Wang | |
| 8,067,478 B1 * | 11/2011 | Meador | C08F 230/08 521/154 |
| 8,214,980 B2 | 7/2012 | Bullock et al. | |
| 8,394,492 B1 * | 3/2013 | Leventis | C04B 41/009 427/385.5 |
| 8,506,914 B2 | 8/2013 | Bara | |
| 8,642,722 B2 | 2/2014 | Jung | |
| 2002/0094426 A1 | 7/2002 | Stepanian et al. | |
| 2004/0087670 A1 * | 5/2004 | Lee | B01J 13/0091 516/99 |
| 2004/0110014 A1 * | 6/2004 | Chen | C08G 73/1007 428/447 |
| 2004/0132845 A1 * | 7/2004 | Rhine | B01J 13/0091 521/82 |
| 2005/0165214 A1 * | 7/2005 | Nobuta | C08G 73/08 528/422 |
| 2007/0152363 A1 | 7/2007 | Begag et al. | |
| 2012/0097907 A1 | 4/2012 | Bauer et al. | |
| 2014/0273701 A1 * | 9/2014 | Samanta | E04B 1/78 442/334 |

* cited by examiner

BENZIMIDAZOLE BASED AEROGEL MATERIALS

REFERENCE TO RELATED APPLICATIONS

This application claims priority from U.S. Provisional Application Ser. No. 61/899,589, filed on Nov. 4, 2013; which is incorporated herein in entirety.

STATEMENT REGARDING FEDERALLY SPONSORED RESEARCH OR DEVELOPMENT

This invention was made with Government support under Contract NNX13CA30P awarded by NASA. The Government has certain rights in this invention.

BACKGROUND

Aerospace programs use advanced heat shield systems to protect spacecraft from the severe heating encountered during hypersonic flight through planetary atmospheres. During entry into a planetary atmosphere, frictional forces subject spacecraft vehicles to extreme thermal conditions by raising the vehicle temperature to levels that are destructive to the outer shell of the spacecraft. Thus, the vehicle's outer shell is typically covered with thermal protection materials that are designed to withstand these extreme thermal conditions and provide insulation to protect the vehicle's outer shell from high temperatures.

Aerospace programs such as NASA are currently developing the Thermal Protection Systems (TPS) needed for exploration missions involving planetary aerocapture and entry. Both reusable and ablative TPS have been developed to protect spacecraft. Reusable TPS have typically been used when reentry conditions are relatively mild, such as for space shuttles. In contrast, ablative TPS materials have been used on planetary entry probes where high heating rates are generated and heat loads are dissipated through phase change and mass loss. Most ablative TPS materials are reinforced composites employing organic resins that produce gaseous products and protective char. In non-oxidizing atmospheres, the resin decomposition reactions are endothermic (vaporization, sublimation) and have an important impact on the net energy to the surface. The gases produced are heated as they percolate toward the surface thus transferring some energy from the solid to the gas.

Future aerospace missions to the inner and outer planets will be more demanding and require improved TPS. The current state-of-the-art for ablative insulators is phenolic impregnated carbon ablator (PICA) which is prepared by impregnating a carbon fiber preform with a thermosetting phenolic/formaldehyde resin SC-1008 originally manufactured by Monsanto. The preparation of PICA is described in U.S. Pat. Nos. 5,536,562, 5,672,389, and 6,955,853. PICA has a char yield of around 55%. PICA generally has better properties relative to many other available ablative TPS material, since the phenolic/formaldehyde resin form a gel which produces a uniform distribution of the resin within the fiber preform. The final ablative material is obtained by drying the gel by evaporating the solvent under vacuum or at elevated temperatures.

Low-density aerogel materials are widely considered to be the best solid insulators available. Aerogels function as insulators primarily by minimizing conduction (low structural density results in tortuous path for energy transfer through the solid framework), convection (large pore volumes and very small pore sizes result in minimal convection), and radiation (IR absorbing or scattering dopants are readily dispersed throughout the aerogel matrix). Aerogels can be used in a broad range of applications, including: heating and cooling insulation, acoustics insulation, electronic dielectrics, aerospace, energy storage and production, and filtration. Aerogel materials display many other interesting acoustic, optical, mechanical, and chemical properties that make them abundantly useful.

However, aerogels can be extremely brittle and difficult to handle.

A need therefore exists for the development of reinforced aerogel materials which are flexible, durable and easy to handle; which have favorable performance as ablative TPS materials; and which have favorable ablative properties such as high char yields.

SUMMARY OF THE INVENTION

An objective of the present invention is to provide an aerogel material which is durable and easy to handle, which has a favorable performance as an ablative TPS material, and which has favorable ablative properties such as high char yields and high thermal stability. The char yield of the aerogel material can be about 60% or more. The aerogel material can be thermally stable up to temperatures of 400° C. or above, 500° C. or above, or 575° C. or above.

Another objective of the present invention is to provide an aerogel material which is durable and easy to handle, which has a favorable performance as an ablative TPS material, and which is flexible enough to be compactly packaged in containers or capsules.

Yet another objective of the present invention is to provide an aerogel material comprising an benzimidazole based aerogel. Specifically, the benzimidazole based aerogel can be a highly porous polybenzimidazole based aerogel. The polybenzimidazole polymer in the polybenzimidazole based aerogel can be the product of a condensation reaction between an aryl amine having at least four amino groups, such as diaminobenzidene, and an aldehyde compound having at least two aldehyde groups, including an aryl dialdehyde such as terephthalaldehyde.

Still another objective of the present invention is to provide a polybenzimidazole based aerogel. The polybenzimidazole polymer in the polybenzimidazole based aerogel can be the product of a condensation reaction between an aryl amine having at least four amino groups and an aldehyde compound having at least two aldehyde groups. The aryl amine having at least four amino groups can comprise a compound represented by the general formula $(H_2N)_2$—$(Ar)_m$-L-$(Ar)_n$—$(NH_2)_2$, such as a compound of Formula 1 or Formula 2:

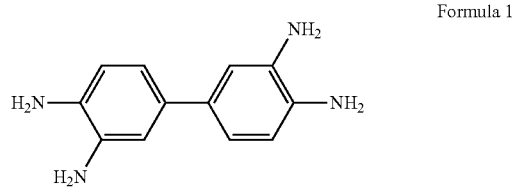

Formula 1

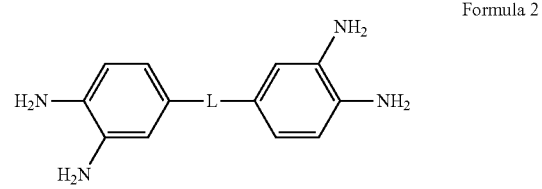

Formula 2 where Ar is an aryl group; m is an integer; n is an integer; L is independently a bond, a single bonded O, CO, S, SO$_2$, a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 alkylarylene group, a substituted or unsubstituted C1 to C30 heteroalkylene group, a substituted or unsubstituted C2 to C30 heterocycloalkylene group, or a substituted or unsubstituted C2 to C30 alkenylene group. The aldehyde compound having at least two aldehyde groups can comprise a compound represented by the general formula OCH—(Ar)$_p$-L-(Ar)$_q$—CHO, such as a compound of Formula 3, Formula 4, Formula 5, or Formula 6:

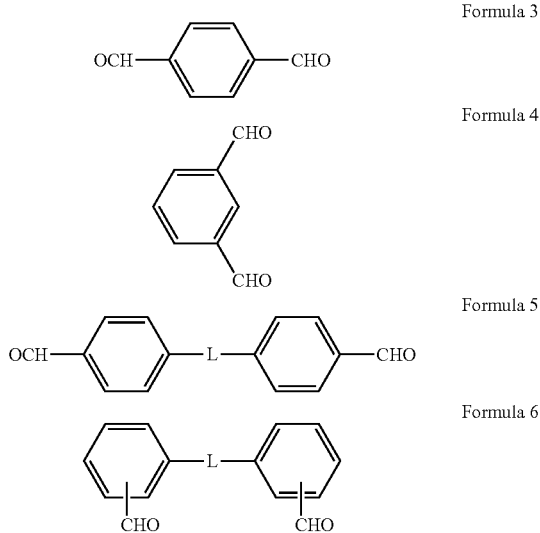

where Ar is an aryl group; p is an integer; q is an integer; L is independently a bond, a single bonded O, CO, S, SO$_2$, a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 alkylarylene group, a substituted or unsubstituted C1 to C30 heteroalkylene group, a substituted or unsubstituted C2 to C30 heterocycloalkylene group, or a substituted or unsubstituted C2 to C30 alkenylene group.

Still yet another objective of the present invention is to provide a method for preparing a polybenzimidazole-based aerogel comprising: a) reacting at least one monomer in a suitable solvent to form a polybenzimidazole gel precursor solution; b) allowing the at least one gel precursor in the precursor solution to transition into a gel material; and c) drying the gel materials to remove at least a portion of the solvent to obtain an polybenzimidazole-based aerogel. In one embodiment, the polybenzimidazole gel precursor solution is formed by mixing an aryl amine having at least four amino groups (such as diaminobenzidene) and an aldehyde compound having at least two aldehyde groups (such as terephthalaldehyde).

A further objective of the present invention is to provide a method for preparing a polybenzimidazole-based aerogel material comprising: a) reacting at least one monomer in a suitable solvent to form a polybenzimidazole gel precursor solution; b) casting the polybenzimidazole gel precursor solution into a fiber reinforcement phase; c) allowing the at least one gel precursor in the precursor solution to transition into a gel material; and d) drying the gel materials to remove at least a portion of the solvent to obtain an polybenzimidazole-based aerogel material. The method can also include a step wherein the solvent in the gel material is replaced with an alcohol with 1 to 4 carbon atoms before drying. The method can further include a step wherein an alcohol solvent in the gel material is replaced with liquid carbon dioxide prior to drying using supercritical carbon dioxide. In one embodiment, the polybenzimidazole gel precursor solution is formed by mixing an aryl amine having at least four amino groups (such as diaminobenzidene) and an aldehyde compound having at least two aldehyde groups (such as terephthalaldehyde).

DETAILED DESCRIPTION

Figure 1:
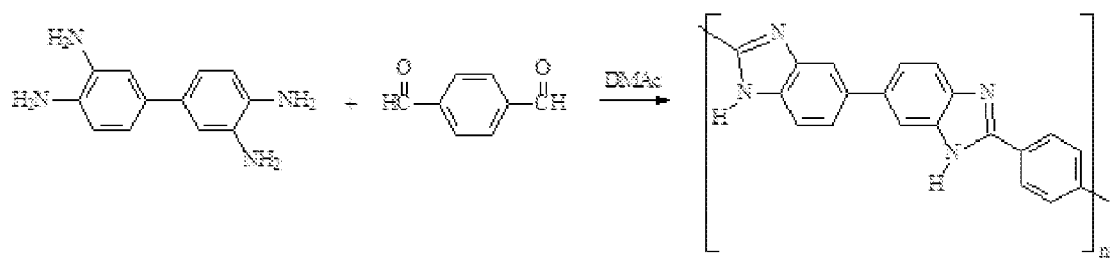
FIG. 1 is a schematic representation of the polymeric reaction resulting in the materials of the present invention.

Aerogels are a class of open-celled materials comprising a framework of interconnected polymeric structures, with a corresponding network of interconnected pores integrated within the framework, and a mobile interstitial phase within the network of pores which is primarily comprised of gases such as air. Aerogels can be distinguished from similar porous materials by their physical and structural properties. Thus, within the context of the present invention, the term "aerogel" refers to a gel comprising a framework of interconnected polymeric structures, with a corresponding network of interconnected pores integrated within the framework, and containing gases such as air as a mobile interstitial dispersion medium; and which is further characterized by the following physical and structural properties attributable to aerogels of the present invention: (1) an average pore diameter ranging from about 0.5 nm to about 1000 nm; (2) a porosity of at least 50%; and (3) a surface area of about 10 m2/g or more.

Aerogels of the present invention thus include any open-celled materials which satisfy the defining elements of an aerogel set forth in the previous paragraph, even if such materials can be otherwise categorized as xerogels, cryogels, microporous materials, or the like. There are several additional properties that may be attributed to aerogels, but which are not limiting according to the use of the term "aerogel" within the context of the present invention. These additional properties include: (1) an average pore diameter preferably ranging from about 0.5 nm to about 100 nm; (2) a porosity preferably of at least 80%; and (3) a surface area preferably of about 100 m2/g or more. These additional properties also include: (4) a pore volume of about 3.0 mL/g or more, preferably about 4.0 mL/g or more; (5) a density of about 0.50 g/cc or less, preferably about 0.25 g/cc or less; and (6) at least 50% of the total pore volume comprising pores having a pore diameter of between 1 and 300 nm.

Within the context of the present invention, the terms "framework" or "framework structure" refer to the network of interconnected polymers or colloidal particles that form the solid structure within in a gel or aerogel. These framework structures typically have a diameter of about 100 angstroms, but can also include networks of interconnected polymers or colloidal particles of all diameter sizes that form the solid structure within in a gel or aerogel. Furthermore, the terms "benzimidazole based aerogel", "polybenzimidazole based aerogel", "benzimidazole based framework", or "polybenzimidazole based framework" refer to an aerogel framework in which benzimidazole comprises at least 50% (by weight) of the polymers or colloidal particles that form the solid framework structure within in the gel or aerogel.

Within the context of the present invention, the term "aerogel material" refers to any composite material which includes aerogel as an element of the composite. Examples of aerogel materials can include, but are not limited to: fiber-reinforced aerogel composites; aerogel composites which include additive elements such as opacifiers; aerogel-foam composites; aerogel-polymer composites; and composite materials which incorporate aerogel particulates, particles, granules, beads, or powders into a solid or semi-solid material, such as binders, resins, cements, foams, polymers, or similar solid materials.

Within the context of the present invention, the term "reinforced aerogel material" refers to aerogel materials which comprise a reinforcing phase within the aerogel material which is not part of the aerogel framework. The reinforcing phase can be any material which provides increased flexibility, resilience, conformability or structural stability to the aerogel material. Examples of well-known reinforcing materials can include, but are not limited to: foam reinforcement materials, polymeric reinforcement materials, and fiber reinforcement materials such as discrete fibers, woven materials, battings, lofty battings, matts, and felts. The term "fiber-reinforced aerogel material" refers to a reinforced aerogel material which comprises a fiber reinforcement material as a reinforcing phase.

Within the context of the present invention, the term "wet gel" refers a gel in which the mobile interstitial phase within the network of interconnected pores is primarily comprised of a liquid, such as a solvent phase or liquid carbon dioxide. Aerogels typically require the initial production of a wet gel, followed by innovative processing and drying to replace the mobile interstitial liquid phase in the gel with air. Examples of wet gels can include, but are not limited to: alcogels, hydrogels, ketogels, carbonogels, and any other wet gels known to those in the art.

Within the context of the present invention, the terms "additive" or "additive element" refer to materials which can be added to an aerogel material before, during, or after the production of the aerogel. Additives can be added to alter or improve desirable properties in an aerogel, or to counteract undesirable properties in an aerogel. Additives are typically added to an aerogel material either prior or during gelation. Examples of additives can include, but are not limited to: microfibers, fillers, reinforcing agents, stabilizers, thickeners, elastic compounds, opacifiers, coloring or pigmentation compounds, smoke suppressants, fire suppressants, radiation absorbing compounds, radiation reflecting compounds, thermally conductive components, phase change materials, pH adjustors, redox adjustors, HCN mitigators, off-gas mitigators, electrically conductive compounds, electrically dielectric compounds, magnetic compounds, radar blocking components, hardeners, and other aerogel additives known to those in the art.

Within the context of the present invention, the terms "flexible" and "flexibility" refer to the ability of an aerogel material to be bent or flexed repeatedly without macrostructural failure. Preferably, aerogel materials of the present invention are capable of bending at least 5°, at least 25°, at least 45°, at least 65°, or at least 85° without macroscopic failure; and/or have a bending radius of less than 4 feet, less than 2 feet, less than 1 foot, less than 6 inches, less than 3 inches, less than 2 inches, less than 1 inch, or less than ½ inch without macroscopic failure. Likewise, the terms "highly flexible" or "high flexibility" refer to aerogel materials capable of bending to at least 90° and/or have a bending radius of less than ½ inch without macroscopic failure. Furthermore, the terms "classified flexible" and "classified as flexible" refer to aerogel materials which can be classified as flexible according to ASTM classification standard C1101 (ASTM International, West Conshohocken, Pa.).

Aerogel materials of the present invention can be flexible, highly flexible, and/or classified flexible. Aerogel materials of the present invention can also be drapable. Within the context of the present invention, the terms "drapable" and "drapability" refer to the ability of an aerogel material to be bent or flexed to 180° or more with a radius of curvature of about 2 inches or less, without macroscopic failure. An aerogel material of the present invention is preferably flexible such that the material is non-rigid and may be applied and conformed to three-dimensional surfaces or objects, or pre-formed into a variety of shapes and configurations to simplify installation or application.

Within the context of the present invention, the terms "resilient" and "resilience" refer to the ability of an aerogel material to return to an original form or dimension following deformation through compression, flexing, or bending. Resilience may be complete or partial, and it may be expressed in terms of percentage return. An aerogel material of the present invention preferably has a resilience of more than 25%, more than 50%, more than 60%, more than 70%, more than 75%, more than 80%, more than 85%, more than 90%, or more than 95% return to an original form or dimension following deformation. Likewise, the terms "classified resilient" and "classified as resilient" refer to aerogel materials which can be classified as resilient flexible according to ASTM classification standard C1101 (ASTM International, West Conshohocken, Pa.).

Within the context of the present invention, the term "self-supporting" refers to the ability of an aerogel material to be flexible and/or resilient based primarily on the physical properties of the aerogel and any reinforcing phase in the aerogel material. Self-supporting aerogel materials can be differentiated from aerogel materials, such as some coatings, which rely on an underlying substrate to provide flexibility and/or resilience to the material.

Within the context of the present invention, the term "shrinkage" refers to the ratio of: 1) the difference between the measured final density of the dried aerogel material and the target density calculated from solid content in the sol-gel precursor solution, relative to 2) the target density calculated from solid content in the sol-gel precursor solution. Shrinkage can calculated by the following equation: Shrinkage=[Final Density (g/cm3)−Target Density (g/cm3)]/[Target Density (g/cm3)]. Preferably, shrinkage of an aerogel material of the present invention is preferably less than 50%, less than 25%, less than 10%, less than 8%, less than 6%, less than 5%, less than 4%, less than 3%, less than 2%, less than 1%, and most preferably about 0%.

Within the context of the present invention, the terms "thermal conductivity" and "TC" refer to a measurement of the ability of a material to transfer heat between two surfaces on either side of the material, with a temperature difference between the two surfaces. Thermal conductivity is specifically measured as the heat energy transferred per unit time and per unit surface area, divided by the temperature difference. It is typically recorded in mW/m*K (milliwatts per meter*Kelvin). The thermal conductivity of a material may be determined by methods known in the art, including, but not limited to: Test Method for Steady-State Thermal Transmission Properties by Means of the Heat Flow Meter Apparatus (ASTM C518, ASTM International, West Conshohocken, Pa.); a Test Method for Steady-State Heat Flux Measurements and Thermal Transmission Properties by Means of the Guarded-Hot-Plate Apparatus (ASTM C177, ASTM International, West Conshohocken, Pa.); a Test Method for Steady-State Heat Transfer Properties of Pipe Insulation (ASTM C335, ASTM International, West Conshohocken, Pa.); a Thin Heater Thermal Conductivity Test (ASTM C1114, ASTM International, West Conshohocken, Pa.); Determination of thermal resistance by means of guarded hot plate and heat flow meter methods (EN 12667, British Standards Institution, United Kingdom); or Determination of steady-state thermal resistance and related properties—Guarded hot plate apparatus (ISO 8203, International Organization for Standardization, Switzerland). Within the context of the present invention, thermal conductivity measurements are acquired according to ASTM C518 standards (FOX TC), at a temperature of about 37.5° C. and an atmosphere of 2 psi, unless otherwise stated. Preferably, aerogel materials of the present invention can have a thermal conductivity of about 100 mW/mK or less, about 80 mW/mK or less, about 75 mW/mK or less, about 70 mW/mK or less, about 65 mW/mK or less, about 60 mW/mK or less, about 55 mW/mK or less, about 50 mW/mK or less, about 40 mW/mK or less, or about 30 mW/mK or less.

Within the context of the present invention, the term "density" refers to a measurement of the mass per unit volume of an aerogel or aerogel material. The term "density" generally refers to the true density of an aerogel, as well as the bulk density of an aerogel material. Density is typically recorded in as kg/m3 or g/cc. The density of an aerogel or aerogel material may be determined by methods known in the art, including, but not limited to: Standard Test Method for Dimensions and Density of Preformed Block and Board—Type Thermal Insulation (ASTM C303, ASTM International, West Conshohocken, Pa.); Standard Test Methods for Thickness and Density of Blanket or Batt Thermal Insulations (ASTM C167, ASTM International, West Conshohocken, Pa.); or Determination of the apparent density of preformed pipe insulation (ISO 18098, International Organization for Standardization, Switzerland). Within the context of the present invention, density measurements are acquired according to ASTM C167 standards, unless otherwise stated. Preferably, aerogel materials of the present invention can have a density of about 0.40 g/cc or less, about 0.30 g/cc or less, about 0.25 g/cc or less, about 0.20 g/cc or less, about 0.18 g/cc or less, about 0.16 g/cc or less, about 0.14 g/cc or less, about 0.12 g/cc or less, about 0.10 g/cc or less, or about 0.05 g/cc or less.

Within the context of the present invention, the terms "char content" and "char yield" refer to the amount of carbonized organic material present in an organic aerogel after exposing the aerogel to high-temperature pyrolysis. The char content of an aerogel can be expressed as a percentage of the amount of organic material present in the aerogel framework after high-temperature pyrolytic treatment, relative to the total amount of material in the original aerogel framework prior to high-temperature pyrolytic treatment. This percentage can be measured using thermo-gravimetric analysis, such as TG-DSC analysis. Specifically, the char yield in an organic aerogel can be correlated with the percentage of weight retained by an organic aerogel material when subjected to high carbonization temperatures during a TG-DSC analysis (with weight loss resulting from moisture evaporation, organic off-gasing, and other materials lost from the aerogel framework during high-temperature pyrolytic treatment). For the purposes of the present invention, char yield is correlated with a carbonization exposure temperature up to 1000° C. Preferably, aerogel materials of the present invention can have a char yield of about 50% or more, about 55% or more, about 60% or more, about 65% or more, or about 70% or more.

Within the context of the present invention, the term "thermal stability" refers to the highest environmental temperature at which the framework of an aerogel is structurally stable. The thermal stability of an aerogel may be determined by methods known in the art, including, but not limited to: thermo-gravimetric analysis, such as TG-DSC analysis. The TGA curve of a material depicts the weight loss percentage of a material as it is exposed to a gradual increase in environmental temperature. At temperatures below the thermal stability temperature of the aerogel, the change in weight loss % will be small with minimal weight losses due to moisture evaporation, minor off-gasing, and other minimal weight loss unrelated to the structural stability of the aerogel framework. The thermal stability of an aerogel is the temperature in the TGA curve where the weight loss curve shows a noticeable increase in the amount of material being lost from the aerogel framework, which is indicated by a clear change in the slope of the TGA curve. Preferably, aerogel materials of the present invention can have a thermal stability of about 300° C. or more, about 400° C. or more, about 500° C. or more, about 525° C. or more, about 550° C. or more, or about 575° C. or more.

Aerogels have a framework of interconnected structures which are most commonly comprised of interconnected polymers or colloidal particles. An aerogel framework can be made from a range of precursor materials, including: inorganic precursor materials (such as precursors used in producing silica-based aerogels); organic precursor materials (such precursors used in producing carbon-based aerogels); hybrid inorganic/organic precursor materials; and combinations thereof. Within the context of the present invention, the term "amalgam aerogel" refers to an aerogel produced from a combination of two or more different gel precursors.

Inorganic aerogels are generally formed from metal oxide or metal alkoxide materials. The metal oxide or metal alkoxide materials can be based on oxides or alkoxides of any metal that can form oxides. Such metals include, but are not limited to: silicon, aluminum, titanium, zirconium, hafnium, yttrium, vanadium, cerium, and the like. Inorganic silica aerogels are traditionally made via the hydrolysis and condensation of silica-based alkoxides (such as tetraethoxylsilane), or via gelation of silicic acid or water glass. Other relevant inorganic precursor materials for silica based aerogel synthesis include, but are not limited to: sodium silicates, alkoxysilanes, partially hydrolyzed alkoxysilanes, tetraethoxylsilane (TEOS), partially hydrolyzed TEOS, condensed polymers of TEOS, tetramethoxylsilane (TMOS), partially hydrolyzed TMOS, condensed polymers of TMOS, tetra-n-propoxysilane, partially hydrolyzed and/or condensed polymers of tetra-n-propoxysilane, polyethylsilicates, partially hydrolyzed polyethysilicates, monomeric alkylalkoxy silanes, bis-trialkoxy alkyl or aryl silanes, polyhedral silsesquioxanes, or combinations thereof.

Organic aerogels are generally formed from carbon-based polymeric precursors. Such polymeric materials include, but are not limited to: polybenzimidazole, resorcinol formaldehydes (RF), polyimide, polyacrylate, polymethyl methacrylate, acrylate oligomers, polyoxyalkylene, polyurethane, polyphenol, polybutadiane, trialkoxysilyl-terminated polydimethylsiloxane, polystyrene, polyacrylonitrile, polyfurfural, melamine-formaldehyde, cresol formaldehyde, phenol-furfural, polyether, polyol, polyisocyanate, polyhydroxybenze, polyvinyl alcohol dialdehyde, polycyanurates, polyacrylamides, various epoxies, agar, agarose, chitosan, and combinations thereof. As one example, organic RF aerogels are typically made from the sol-gel polymerization of resorcinol or melamine with formaldehyde under alkaline conditions.

Organic/inorganic hybrid aerogels are mainly comprised of ormosil (organically modified silica) aerogels. These ormosil materials include organic components which are covalently bonded to a silica network. Ormosils are typically formed through the hydrolysis and condensation of organically modified silanes, $R-Si(OX)_3$, with traditional alkoxide precursors, $Y(OX)_4$. In these formulas: X may represent, for example, $CH_3$, $C_2H_5$, $C_3H_7$, $C_4H_9$; Y may represent, for example, Si, Ti, Zr, or Al; and R may be any organic fragment such as methyl, ethyl, propyl, butyl, isopropyl, methacrylate, acrylate, vinyl, epoxide, and the like. The organic components in ormosil aerogel may also be dispersed throughout or chemically bonded to the silica network.

Within the context of the present invention, the term "ormosil" encompasses the foregoing materials as well as other organically modified ceramics, sometimes referred to as "ormocers." Ormosils are often used as coatings where an ormosil film is cast over a substrate material through, for example, the sol-gel process. Examples of other organic-inorganic hybrid aerogels of the invention include, but are not limited to, silica-polyether, silica-PMMA, silica-chitosan, carbides, nitrides, and other combinations of the aforementioned organic and inorganic aerogel forming compounds. Published US Pat. App. 20050192367 (Paragraphs [0022]-[0038] and [0044]-[0058]) includes teachings of such hybrid organic-inorganic materials, and is hereby incorporated by reference according to the individually cited sections and paragraphs.

Aerogels of the present invention are preferably organic aerogels formed primarily from DMAc solutions of polybenzimidazole polymers formed from a condensation reaction between an aryl amine having at least four amino groups and an aldehyde compound having at least two aldehyde groups. However, the invention as a whole may be practiced with any other aerogel compositions known to those in the art, and is not limited to any one precursor material or amalgam mixture of precursor materials.

Aerogels of the present invention can include polybenzimidazole based aerogels. The polybenzimidazole polymer in the polybenzimidazole based aerogel can be the product of a condensation reaction between an aryl amine having at least four amino groups and an aldehyde compound having at least two aldehyde groups.

The aryl amine having at least four amino groups can comprise a compound represented by the general formula $(H_2N)_2-(Ar)_m-L-(Ar)_n-(NH_2)_2$, such as a compound of Formula 1 or Formula 2:

Formula 1

Formula 2 where Ar is an aryl group; m is an integer; n is an integer; L is independently a bond, a single bonded O, CO, S, $SO_2$, a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 alkylarylene group, a substituted or unsubstituted C1 to C30 heteroalkylene group, a substituted or unsubstituted C2 to C30 heterocycloalkylene group, or a substituted or unsubstituted C2 to C30 alkenylene group.

The aldehyde compound having at least two aldehyde groups can comprise a compound represented by the general formula $OCH-(Ar)_p-L-(Ar)_q-CHO$, such as a compound of Formula 3, Formula 4, Formula 5, or Formula 6:

Formula 3

Formula 4

Formula 5

Formula 6 where Ar is an aryl group; p is an integer; q is an integer; L is independently a bond, a single bonded O, CO, S, $SO_2$, a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 alkylarylene group, a substituted or unsubstituted C1 to C30 heteroalkylene group, a substituted or unsubstituted C2 to C30 heterocycloalkylene group, or a substituted or unsubstituted C2 to C30 alkenylene group.

Production of an aerogel generally includes the following steps: i) formation of a sol-gel solution; ii) formation of a gel from the sol-gel solution; and iii) drying the gel through innovative processing and drying. This process is discussed below in greater detail, specifically in the context of forming organic aerogels such as polybenzimidazole based aerogels. However, the specific examples and illustrations provided herein are not intended to limit the present invention to any specific type of aerogel and/or method of preparation. The present invention can include any aerogel formed by any associated method of preparation known to those in the art.

The first step in forming an organic aerogel is generally the formation of a sol-gel solution through reacting polymeric precursors in a solvent. Major variables in the formation of aerogels include the type of precursors included in the sol-gel solution, the nature of the solvent, the processing temperature and pH of the sol-gel solution, and precursor/solvent ratio within the sol-gel solution. Control of these variables in forming a sol-gel solution can permit control of the growth and aggregation of the gel framework during the subsequent transition of the gel material from the "sol" state to the "gel" state. While properties of the resulting aerogels are strongly affected by the pH of the precursor solution and the molar ratio of the reactants, any pH and any molar ratios that permit the formation of gels may be used in the present invention.

A sol-gel solution is formed by combining at least one gelling precursor with a solvent. Examples of suitable solvents for use in forming a sol-gel solution include, but are not limited to: lower alcohols with 1 to 6 carbon atoms, ethyl acetate, ethyl acetoacetate, acetone, dichloromethane, tetrahydrofuran, Dimethylacetamide (DMAc) and the like. Multiple solvents can also be combined to achieve a desired level of dispersion or to optimize properties of the gel material. Selection of optimal solvents for the sol-gel and gel formation steps thus depends on the specific precursors, fillers and additives being incorporated into the sol-gel solution; as well as the target processing conditions for gelling and drying, and the desired properties of the final aerogel materials.

Acids and bases can be incorporated into the sol-gel solution to control the pH of the solution, and to catalyze the condensation reactions of the precursor materials. While any acid may be used to catalyze precursor reactions and to obtain a lower pH solution, preferable acids include: HCl, $H_2SO_4$ and HF. Any base may likewise be used to catalyze precursor reactions and to obtain a higher pH solution, with a preferable base comprising $NH_4OH$.

The sol-gel solution can include additional co-gelling precursors, as well as filler materials and other additives. Filler materials and other additives may be dispensed in the sol-gel solution at any point before or during the formation of a gel. Filler materials and other additives may also be incorporated into the gel material after gelation through various techniques known to those in the art. Preferably, the sol-gel solution comprising the gelling precursors, solvents, catalysts, filler materials and other additives is a homogenous solution which is capable of effective gel formation.

Once a sol-gel solution has been formed and optimized, the gel-forming components in the sol-gel can be transitioned into a gel material. The process of transitioning gel-forming components into a gel material comprises an initial gel formation step wherein the gel solidifies up to the gel point of the gel material. The gel point of a gel material may be viewed as the point where the gelling solution exhibits resistance to flow and/or forms a substantially continuous polymeric framework throughout its volume. A range of gel-forming techniques are known to those in the art. Examples include, but are not limited to: maintaining the mixture in a quiescent state for a sufficient period of time; adjusting the pH of the solution; adjusting the temperature of the solution; directing a form of energy onto the mixture (ultraviolet, visible, infrared, microwave, ultrasound, particle radiation, electromagnetic); or a combination thereof.

A mold may be used to cast the gel materials of the present invention into desired shapes. One benefit of using a mold may be an improved aesthetic appearance. Another benefit may be the creation of features in the gel material which are difficult or damaging to produce without mold casting. Such features include, but are not limited to: holes, depressions, protrusions and patterns; all of which can allow for a better fit between the final aerogel material and a supporting structure. Reinforced aerogel materials can also be incorporated into this molding procedure.

A casting table may be also used to cast the gel materials of the present invention. The casting table can include a casting frame enclosing a casting area, wherein the thickness of the casting frame can then be used as a thickness template to ensure that the thickness of the resulting gel material matches the initial target thickness of the gel material. To ensure that the gel material being cast on the casting table has a uniform thickness which matches the target thickness of the casting frame, a source of pressure can be applied to the gel material during the casting process, or subsequent to the casting process but prior to complete gelation of the gel material. Using a casting table allows for the production of aerogel materials which are extremely thin compared to standard aerogel materials. Preferably, aerogel materials of the present invention can have a thickness of less than 10 mm, less than 5 mm, less than 3 mm, less than 2 mm, and less than 1 mm. Using a casting table also allows for the production of aerogel materials which have a uniform thickness throughout the material. Aerogel materials of the present invention can have a thickness variation of less than 10%, less than 5%, and less than 2%.

The process of transitioning gel-forming components into a gel material can also include an aging step (also referred to as curing) prior to drying. Aging a gel material after it reaches its gel point can further strengthen the gel framework by increasing the number of cross-linkages within the network. The duration of gel aging can be adjusted to control various properties within the resulting aerogel material. This aging procedure can be useful in preventing potential volume loss and shrinkage during drying. Aging can involve: maintaining the gel (prior to drying) at a quiescent state for an extended period; maintaining the gel at elevated temperatures; adding cross-linkage promoting compounds; or any combination thereof. The preferred temperatures for aging are usually between about 10° C. and about 130° C. The aging of a gel material typically continues up to the drying of the wet-gel material.

The time period for transitioning gel-forming materials into a gel material includes both the duration of the initial gel formation (from initiation of gelation up to the gel point), as well as the duration of any subsequent curing and aging of the gel material prior to drying (from the gel point up to the initiation of drying). The total time period for transitioning gel-forming materials into a gel material is typically between about 1 minute and several days, preferably about 24 hours or less, and more preferably about 10 hours or less.

The resulting gel material may be washed in a suitable secondary solvent to replace the primary reaction solvent present in the wet-gel. Such secondary solvents may be linear monohydric alcohols with 1 or more aliphatic carbon atoms, dihydric alcohols with 2 or more carbon atoms, branched alcohols, cyclic alcohols, alicyclic alcohols, aromatic alcohols, polyhydric alcohols, ethers, ketones, cyclic ethers or their derivative.

Once a gel material has been formed and processed, the gel can then be dried using innovative processing and drying techniques to form an aerogel material. Drying plays an important role in engineering the characteristics of aerogels, such as porosity and density, as well as related properties such as thermal conductivity. Generally, aerogels are obtained when gels are dried in a manner that causes minimal change and shrinkage to the porous network and framework of the wet gel.

Aerogels are commonly dried by removing the liquid mobile phase from the gel material at a temperature and pressure above the critical point of the liquid mobile phase. Once the critical point is surpassed (supercritical), the phase boundary between the liquid and vapor phase of the solvent is removed and there is no physical distinction between the liquid and vapor phase. The solvent can then be removed without introducing a liquid-vapor interface, capillary pressure, or any associated mass transfer limitations onto the gel network. If evaporation occurs below this point, strong capillary forces generated by liquid evaporation can cause shrinkage and pore collapse within the aerogel material. Maintaining the mobile phase above the critical pressure and temperature during the solvent extraction process minimizes the negative effects of such capillary forces. Co-solvents and solvent exchanges are also commonly used to optimize the supercritical fluid drying process.

Several additional aerogel drying techniques are known in the art, including a range of different approaches in the use of supercritical fluids in drying aerogels. For example, Kistler (J. Phys. Chem. (1932) 36: 52-64) describes a simple supercritical drying process where the gel solvent is maintained above its critical pressure and temperature, thereby minimizing evaporative capillary forces and maintaining the structural integrity of the gel network. U.S. Pat. No. 4,610,863 describes a drying process where the gel solvent is exchanged with liquid carbon dioxide and subsequently dried at conditions where carbon dioxide is in a supercritical state. U.S. Pat. No. 6,670,402 teaches drying a gel via rapid solvent exchange by injecting supercritical (rather than liquid) carbon dioxide into an extractor that has been pre-heated and pre-pressurized to substantially supercritical conditions or above, thereby producing aerogels. U.S. Pat. No. 5,962,539 describes a process for obtaining an aerogel from a polymeric material that is in the form a sol-gel in an organic solvent, by exchanging the organic solvent for a fluid having a critical temperature below a temperature of polymer decomposition, and supercritically drying the fluid/sol-gel. U.S. Pat. No. 6,315,971 discloses a process for producing gel compositions comprising: drying a wet gel comprising gel solids and a drying agent to remove the drying agent under drying conditions sufficient to minimize shrinkage of the gel during drying. U.S. Pat. No. 5,420,168 describes a process whereby Resorcinol/Formaldehyde aerogels can be manufactured using a simple air drying procedure. U.S. Pat. No. 5,565,142 describes subcritical drying techniques in which the gel surface is modified to be stronger and more hydrophobic, such that the gel framework and pores can resist collapse during ambient or subcritical drying. Other examples of drying aerogel materials can be found in U.S. Pat. Nos. 5,275,796 and 5,395,805.

One preferred embodiment of drying the wet-gel uses supercritical conditions of carbon dioxide, including, for example: first substantially exchanging the primary solvent present in the pore network of the gel with liquid carbon dioxide; and then heating the wet gel (typically in an autoclave) beyond the critical temperature of carbon dioxide (about 31.06° C.) and increasing the pressure of the system to a pressure greater than about 1070 psig. The pressure around the gel material is then fluctuated to facilitate removal of the supercritical carbon dioxide fluid from the gel. carbon dioxide can be recirculated through the drying system to facilitate the continual removal of the primary solvent from the wet gel. Finally, the temperature and pressure are slowly returned to ambient conditions to produce a dry aerogel material. carbon dioxide can also be pre-processed into a supercritical state prior to being injected into a drying chamber. In another embodiment, the solvent in the gel material is replaced with an alcohol with 1 to 4 carbon atoms before drying with supercritical carbon dioxide fluid.

Another preferred embodiment of drying the wet-gel uses subcritical conditions of carbon dioxide. To dry the samples under subcritical conditions, the temperature is kept at room temperature and the pressure is kept below 900 psi. At 22° C., the pressure of carbon dioxide is 870 psi and the surface tension is ~1 mN/m.

Polybenzimidazole based aerogels of the present invention can be made by a method for preparing a polybenzimidazole-based aerogel comprising: a) reacting at least one monomer in a suitable solvent (such as DMAc) to form a polybenzimidazole gel precursor solution; b) allowing the at least one gel precursor in the precursor solution to transition into a gel material; and c) drying the gel materials to remove at least a portion of the solvent to obtain an polybenzimidazole-based aerogel. In one embodiment, the polybenzimidazole gel precursor solution is formed by mixing an aryl amine having at least four amino groups (such as diaminobenzidene) and an aldehyde compound having at least two aldehyde groups (such as terephthalaldehyde).

Large-scale production of aerogel materials can be complicated by difficulties related to the continuous formation of gel materials on a large scale; as well as the difficulties related to drying gel materials in large volumes using innovative processing and drying techniques, to form aerogel materials on a large scale. Aerogel materials of the present invention are preferably accommodating to production on a large scale. In one embodiment, gel materials of the present invention can be produced in large scale through a continuous casting and gelation process. In another embodiment, aerogel materials of the present invention are be produced in a large scale which requires the use of large scale drying vessels. Large scale drying vessels of the present invention can include drying vessels which have a volume of about 0.1 $m^3$ or more, about 0.25 $m^3$ or more, about 0.5 $m^3$ or more, or about 0.75 $m^3$ or more.

The embodiments of the present invention can be practiced using any of the processing, drying and treatment techniques discussed herein, as well as other processing, drying and treatment techniques known to those in the art for producing aerogels and aerogel materials as defined herein.

Aerogel materials may be fiber-reinforced with various fiber reinforcement materials to achieve a more flexible, resilient and conformable composite product. The fiber reinforcement materials can be added to the gels at any point in the gelling process to produce a wet, fibrous gel material. In one embodiment, a polybenzimidazole gel precursor solution is dispensed into fiber reinforcement phase and allowed to transition into a wet-gel material. The wet gel material may then be dried to produce a fiber-reinforced polybenzimidazole aerogel material. Fiber reinforcements may be in the form of discrete fibers, woven materials, or non-woven materials such as battings, lofty battings, matts, or felts. Fiber reinforcements can be made from organic fibrous materials, inorganic fibrous materials, or combinations thereof.

Fiber reinforcement materials of the present invention can include flexible fibrous carbon materials or fibrous graphite materials. These fiber reinforcement materials can have densities from about 0.01 g/cc to about 0.3 g/cc, and preferably from 0.08 g/cc to 0.12 g/cc. Suitable fibrous materials include, but not limited to, fibrous products produced by: Morgan AM&T, Optimat, and Fiber Materials (now subsidiary of Graftech). Flexible oxide fibrous materials are also commercially available and include materials such as Saffil, Zircar zirconia felt, aluminum silicate fibers, and Fiberfrax mat. Table 1 summarizes certain physicochemical properties of carbon fiber materials useful in the present invention. The surface pH is usually measured by taking a specimen from the surface and measuring its pH in water.

TABLE 1

Carbon fiber sources and properties.

| Fiber Type | Surface pH | TC (mW/m-K) | Density (g/cc) | AVG Thickness (mm) |
|---|---|---|---|---|
| FMI Carbon Felt | 10.0 | 49.3 | 0.134 | 3.8 |
| Morgan Carbon Felt | 8.7 | 81.3 | 0.094 | 2.8 |
| Optimat 20501A | 6.6 | 36.5 | 0.046 | 2.2 |

Fiber reinforcement materials can be incorporated into the aerogel material as continuous sheet of fiber materials. The process comprises initially producing a continuous sheet of fiber reinforced gel. These fiber-reinforced gel sheets may be then be dried to produce a sheet-like, fiber reinforced aerogel material. The terms "aerogel blanket" or "aerogel blanket material" refer to aerogel materials reinforced with a continuous sheet of fiber reinforcement material. Aerogel blanket materials are differentiated from fiber-reinforced aerogel materials which are reinforced with a non-continuous fiber network, such as agglomerates or clumps of fiber materials. Aerogel blanket materials are also differentiated from aerogel materials comprising connected honeycomb sections. Aerogel blanket materials are particularly useful for applications requiring flexibility, since they are highly conformable and can be used like a blanket to cover surfaces of simple or complex geometry, while also retaining the excellent thermal insulation properties of aerogels. Aerogel blankets and similar fiber-reinforced aerogel composites are described in Published US patent application 2002/0094426 (paragraphs 12-16, 25-27, 38-58, 60-88), which is hereby incorporated by reference according to the individually cited sections and paragraphs. The terms "lofty aerogel blanket" or "lofty aerogel blanket material" refer to aerogel materials reinforced with a continuous sheet of non-woven lofty fibrous batting, as defined in the incorporated paragraphs of Published US patent application 2002/0094426.

Polybenzimidazole based aerogels of the present invention can be made by a method for preparing a polybenzimidazole-based aerogel comprising: a) reacting at least one monomer in a suitable solvent to form a polybenzimidazole gel precursor solution; b) casting the polybenzimidazole gel precursor solution into a fiber reinforcement phase; c) allowing the at least one gel precursor in the precursor solution to transition into a gel material; and d) drying the gel materials to remove at least a portion of the solvent to obtain an polybenzimidazole-based aerogel material. The method can also include a step wherein the solvent in the gel material is replaced with an alcohol with 1 to 4 carbon atoms before drying. The method can further include a step wherein an alcohol solvent in the gel material is replaced with liquid carbon dioxide prior to drying using supercritical carbon dioxide. In one embodiment, the polybenzimidazole gel precursor solution is formed by mixing an aryl amine having at least four amino groups (such as diaminobenzidene) and an aldehyde compound having at least two aldehyde groups (such as terephthalaldehyde). In another embodiment, the fiber reinforcement phase is an Optimat product, such as Optimat 20501A.

Aerogel materials can also include inorganic fillers (particles or fibers) to increase the char strength and reduce the erosion rate. The inorganic fillers act as a secondary reinforcement which improves the physical properties of the aerogel material. As one example, the effect of $ZrB_2$ on the ablative properties of carbon composites has been studied. (X. Li, J. Shi, G. Zhang, Q. Guo, and L. Li., *Material Letters,* 60, 892 (2006)). Examples of additional inorganic filler compounds include and are not limited to: HfO, $Al_2O_3$, $TiO_2$, SiC, TiC, ZrC, or mixtures thereof.

The aerogel materials of the present invention have been shown to be highly effective as insulation materials, including used as ablative TPS materials in aerospace applications. However, application of the methods and materials of the present invention are not intended to be limited to applications related to ablative TPS insulation materials. The methods and materials of the present invention can be applied to any system or application which would benefit from the unique combination of properties or procedures provided by the materials and methods of the present invention.

The following examples provide various non-limiting embodiments and properties of the present invention.

Example 1

Preparation of Polybenzimidazole (PBI) Aerogels

Polybenzimidazole (PBI) precursor solutions were prepared by combining 3,3'-diaminobenzidine and terephthaldehyde in a solution of N,N'-dimethylacetamide (DMAc) at polymer concentrations ranging from 0.085 to 0.190 g/cc. A schematic representation of this polymeric reaction is shown in FIG. 1. Precursor components were combined at room temperature (RT) in a 1:1 molar ratio. The reaction between the diaminobenzidene and the terephthalaldehyde produced a red sol solution with concentrations ranging from 0.085 to 0.19 g/cc. The sol solution typically gelled within 10-15 minutes at room temperature. Gels were then aged at RT, or transferred to an oven and allowed to age at temperatures ranging from 24-130° C., with a duration of aging ranging between 1 hour to 16 hours. The DMAc solvent was then exchanged for ethanol. A portion of the gel samples were dried using supercritical carbon dioxide conditions; the remaining portion of the gel samples were dried using subcritical carbon dioxide conditions. The final densities of aerogel samples ranged from 0.12-0.248 g/cc, with surface areas between 20-100 $m^2/g$.

Example 2

Char Yield and Thermal Stability Testing

Figure 2:
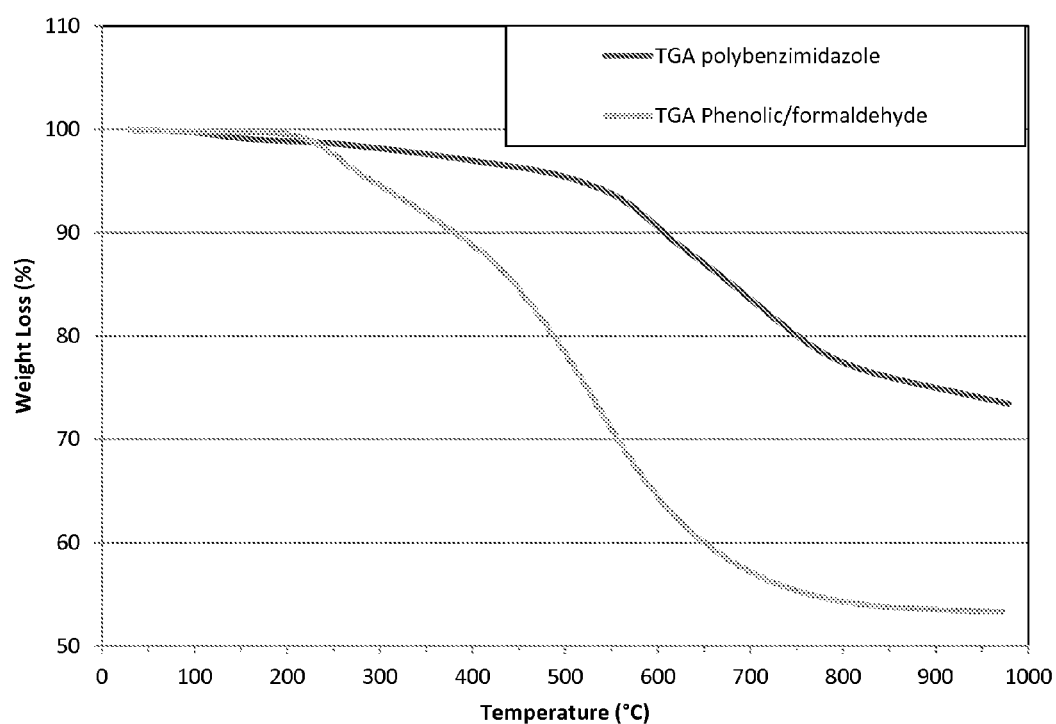
FIG. 2 shows the thermogravimetric analysis (TGA) of phenol/formaldehyde and polybenzimidazole aerogels.

Thermogravimetric analysis (TGA) in argon was conducted on the PBI aerogels produced in Example 1 (0.167 g/cc). Results of this testing are shown in FIG. 2. After heating in argon to 1000° C., 74.3 wt % of the PBI aerogel sample remained as charred carbon; compared to 55.8 wt % for that of a PICA sample. TGA analysis also showed the PBI aerogel to be thermally stable to temperatures of 575° C. or above (as depicted by the TGA PBI curve in FIG. 2 showing minimal weight loss % up to temperatures of about 575° C.); compared to the PICA sample having a thermal stability only up to about 225° C. (as depicted by the TGA PICA curve in FIG. 2 showing significant weight loss % starting at about 225° C.).

Example 3

Preparation of Flexible, Fiber Reinforced PBI Aerogel Materials

Polybenzimidazole (PBI) precursor solutions were produced according to Example 1, with polymer concentrations ranging from 0.085 to 0.122 g/cc. The sol-solutions were cast into either a Morgan AM&T fiber reinforcement phase or an Optimat 20501A fiber reinforcement phase, with coupon dimensions of either 4×4 or 6×6, and then allowed to gel. The samples were aged for 16 hours at temperatures ranging from 60 to 130° C. The DMAc solvent was then exchanged for ethanol, and the gel samples were dried using supercritical carbon dioxide.

Thermal conductivity analysis was completed on the aerogel materials. Corresponding TC values (according to ASTM C177 testing) and FOX TC values (according to ASTM C518 testing using LaserComp Fox 200) are shown in Table 2.

| Entry # | Sample ID | Temp. (° C.) | Time (h) | Fiber | Size | TC (mW/m-K) | FOX TC (mW/m-K) | Target Density (g/cc) | Coupon Density (g/cc) |
|---|---|---|---|---|---|---|---|---|---|
| 1 | 228016-1 | 60 | 16 | Morgan | 6 × 6 | 58.9 | 65.9 | 0.085 | 0.15 |
| 2 | 228016-1a | 60 | 16 | Morgan | 4 × 4 | 68.4 | 65.9 | 0.085 | 0.154 |
| 3 | 228016-2 | 60 | 16 | Morgan | 6 × 6 | 49 | 66.5 | 0.122 | 0.17 |
| 4 | 228016-2a | 60 | 16 | Morgan | 4 × 4 | 76.9 | 66.5 | 0.122 | 0.196 |
| 5 | 228027-1 | 60 | 16 | Morgan | 4 × 4 | 46.1 | 67.0 | 0.085 | 0.141 |
| 6 | 228027-2 | 80 | 16 | Morgan | 4 × 4 | 71.5 | 74.3 | 0.085 | 0.157 |
| 7 | 228027-3 | 100 | 16 | Morgan | 4 × 4 | 43.7 | 77.1 | 0.085 | 0.155 |
| 8 | 228027-4 | 130 | 16 | Morgan | 4 × 4 | 61.4 | 79.5 | 0.085 | 0.160 |
| 9 | 228027-5 | 130 | 16 | Morgan | 4 × 4 | 42.7 | 76.2 | 0.085 | 0.091 |
| 10 | 228027-1a* | 60 | 16 | Morgan | 4 × 4 | 63.9 | 76.4 | 0.085 | 0.153 |
| 11 | 228027-2a* | 80 | 16 | Morgan | 4 × 4 | 60.1 | 73.8 | 0.085 | 0.16 |
| 12 | 228037-1 | 60 | 16 | Morgan | 6 × 6 | — | 71.5 | 0.065 | 0.123 |
| 13 | 228037-2 | 120 | 16 | Morgan | 6 × 6 | — | 67.8 | 0.065 | 0.133 |
| 14 | 228037-3 | 60 | 16 | Optimat | 6 × 6 | — | 40.2 | 0.065 | 0.092 |
| 15 | 228037-4 | 120 | 16 | Optimat | 6 × 6 | — | 41.8 | 0.065 | 0.122 |
| 16 | 228037-5 | 60 | 16 | Morgan | 6 × 6 | — | 73.9 | 0.085 | 0.139 |
| 17 | 228037-6 | 120 | 16 | Morgan | 6 × 6 | — | 72.4 | 0.085 | 0.131 |
| 18 | 228037-7 | 60 | 16 | Optimat | 6 × 6 | — | 39.6 | 0.085 | 0.128 |
| 19 | 228037-8 | 120 | 16 | Optimat | 6 × 6 | — | 48.6 | 0.085 | 0.153 |
| 20 | 228037-9 | 60 | 16 | Morgan | 6 × 6 | — | 73.1 | 0.105 | 0.157 |
| 21 | 228037-10 | 120 | 16 | Morgan | 6 × 6 | — | 73.4 | 0.105 | 0.159 |
| 22 | 228037-11 | 60 | 16 | Optimat | 6 × 6 | — | 41.5 | 0.105 | 0.148 |
| 23 | 228037-12 | 120 | 16 | Optimat | 6 × 6 | — | 44.8 | 0.105 | 0.158 |

As used herein, the conjunction "and" is intended to be inclusive and the conjunction "or" is not intended to be exclusive unless otherwise indicated. For example, the phrase "or, alternatively" is intended to be exclusive.

The use of the terms "a", "an", "the", or similar referents in the context of describing the invention (especially in the context of the claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

As used herein, the term "about" refers to a degree of deviation typical for a particular property, composition, amount, value or parameter as identified; such as deviations based on experimental errors, measurement errors, approximation errors, calculation errors, standard deviations from a mean value, routine minor adjustments, and so forth.

Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context.

The use of any and all examples, or exemplary language (e.g., "such as", "for example") provided herein, is intended merely to better illuminate the invention and does not pose a limitation on the scope of the invention unless otherwise claimed.

What is claimed is:

1. A benzimidazole-based aerogel.

2. A fiber-reinforced aerogel material comprising the benzimidazole-based aerogel of claim 1.

3. The aerogel of claim 1, wherein the benzimidazole-based aerogel has a char yield of 57% or more.

4. The aerogel of claim 3, wherein the benzimidazole-based aerogel has a char yield of 60% or more.

5. The aerogel of claim 1, wherein the benzimidazole-based aerogel has a thermal stability of 400° C. of more.

6. The aerogel of claim 5, wherein the benzimidazole-based aerogel has a thermal stability of 500° C. of more.

7. The aerogel of claim 1, wherein the benzimidazole-based aerogel is comprised of a benzimidazole polymer in an aerogel framework, said benzimidazole polymer is the product of a reaction between an aryl amine having at least four amino groups and an aldehyde compound having at least two aldehyde groups.

8. The aerogel of claim 7, wherein the aryl amine is represented by the general formula: $(H_2N)_2$—$(Ar)_m$-L-$(Ar)_n$—$(NH_2)_2$; where Ar is an aryl group; m is an integer; n is an integer; and L is independently a bond, a single bonded O, CO, S, $SO_2$, a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 alkylarylene group, a substituted or unsubstituted C1 to C30 heteroalkylene group, a substituted or unsubstituted C2 to C30 heterocycloalkylene group, or a substituted or unsubstituted C2 to C30 alkenylene group.

9. The aerogel of claim 8, wherein the aryl amine is a compound of Formula 1 or Formula 2:

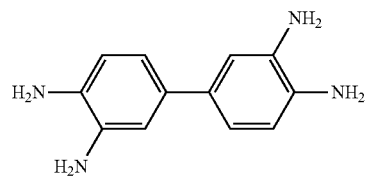

Formula 1

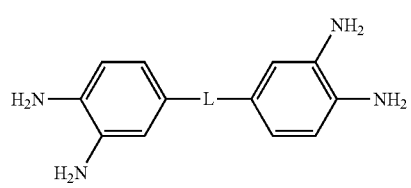

Formula 2 where L is independently a bond, a single bonded O, CO, S, SO$_2$, a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 alkylarylene group, a substituted or unsubstituted C1 to C30 heteroalkylene group, a substituted or unsubstituted C2 to C30 heterocycloalkylene group, or a substituted or unsubstituted C2 to C30 alkenylene group.

10. The aerogel of claim 7, wherein the aryl amine is diaminobenzidene.

11. The aerogel of claim 7, wherein the aldehyde compound is represented by the general formula: OCH—(Ar)$_p$-L-(Ar)$_q$—CHO; where Ar is an aryl group; p is an integer; q is an integer; and L is independently a bond, a single bonded O, CO, S, SO$_2$, a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 alkylarylene group, a substituted or unsubstituted C1 to C30 heteroalkylene group, a substituted or unsubstituted C2 to C30 heterocycloalkylene group, or a substituted or unsubstituted C2 to C30 alkenylene group.

12. The aerogel of claim 11, wherein the aldehyde compound is a compound of Formula 3, Formula 4, Formula 5, or Formula 6:

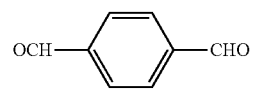

Formula 3

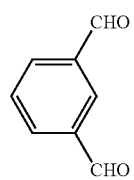

Formula 4

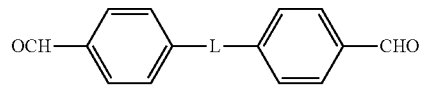

Formula 5

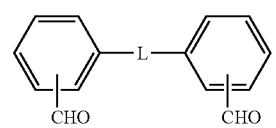

Formula 6 where L is independently a bond, a single bonded O, CO, S, SO$_2$, a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 alkylarylene group, a substituted or unsubstituted C1 to C30 heteroalkylene group, a substituted or unsubstituted C2 to C30 heterocycloalkylene group, or a substituted or unsubstituted C2 to C30 alkenylene group.

13. The aerogel of claim 7, wherein the aldehyde compound is terephthalaldehyde.

14. The aerogel of claim 7, wherein the aryl amine is diaminobenzidene, and wherein the aldehyde compound is terephthalaldehyde.

15. A method for preparing a benzimidazole-based aerogel, comprising:
   a. reacting at least one suitable monomer in a suitable solvent to form a polybenzimidazole gel precursor solution;
   b. allowing the at least one gel precursor in the precursor solution to transition into a gel material; and
   c. drying the gel materials to remove at least a portion of the solvent to obtain a benzimidazole-based aerogel.

16. The method of claim 15, wherein the aerogel is dried using carbon dioxide under supercritical carbon dioxide conditions.

17. The method of claim 15, wherein the aerogel is dried using carbon dioxide under subcritical carbon dioxide conditions.

18. The method of claim 15, wherein the method for preparation of a benzimidazole-based aerogel more specifically comprises:
   a. reacting at least one monomer in a suitable solvent to form a polybenzimidazole gel precursor solution;
   b. casting the polybenzimidazole gel precursor solution into a fiber reinforcement phase;
   c. allowing the at least one gel precursor in the precursor solution to transition into a gel material; and
   d. drying the gel materials to remove at least a portion of the solvent to obtain a benzimidazole-based aerogel.

19. The method of claim 18, wherein the aerogel is dried using carbon dioxide under supercritical carbon dioxide conditions.

20. The method of claim 18, wherein the aerogel is dried using carbon dioxide under subcritical carbon dioxide conditions.

21. The method of claim 15, wherein the benzimidazole polymers in the aerogel framework are the product of a reaction between an aryl amine having at least four amino groups and an aldehyde compound having at least two aldehyde groups.

22. The method of claim 18, wherein the benzimidazole polymers in the aerogel framework are the product of a reaction between an aryl amine having at least four amino groups and an aldehyde compound having at least two aldehyde groups.

23. The method of claim 21, wherein the aryl amine is represented by the general formula: $(H_2N)_2—(Ar)_m-L-(Ar)_n—(NH_2)_2$; where Ar is an aryl group; m is an integer; n is an integer; and L is independently a bond, a single bonded O, CO, S, $SO_2$, a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 alkylarylene group, a substituted or unsubstituted C1 to C30 heteroalkylene group, a substituted or unsubstituted C2 to C30 heterocycloalkylene group, or a substituted or unsubstituted C2 to C30 alkenylene group.

24. The method of claim 23, wherein the aryl amine is a compound of Formula 1 or Formula 2:

Formula 1

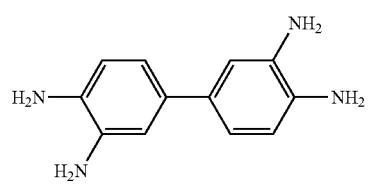

Formula 2

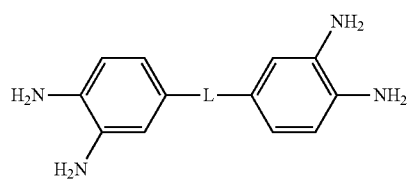

where L is independently a bond, a single bonded O, CO, S, $SO_2$, a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 alkylarylene group, a substituted or unsubstituted C1 to C30 heteroalkylene group, a substituted or unsubstituted C2 to C30 heterocycloalkylene group, or a substituted or unsubstituted C2 to C30 alkenylene group.

25. The method of claim 21, wherein the aryl amine is diaminobenzidene.

26. The method of claim 21, wherein the aldehyde compound is represented by the general formula: $OCH—(Ar)_p-L-(Ar)_q—CHO$; where Ar is an aryl group; p is an integer; q is an integer; and L is independently a bond, a single bonded O, CO, S, $SO_2$, a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 alkylarylene group, a substituted or unsubstituted C1 to C30 heteroalkylene group, a substituted or unsubstituted C2 to C30 heterocycloalkylene group, or a substituted or unsubstituted C2 to C30 alkenylene group.

27. The method of claim 26, wherein the aldehyde compound is a compound of Formula 3, Formula 4, Formula 5, or Formula 6:

Formula 3

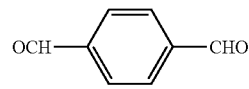

Formula 4

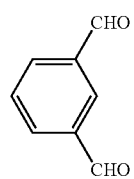

Formula 5

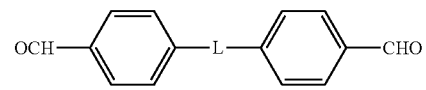

Formula 6

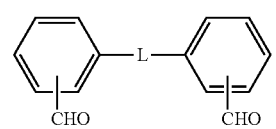

where L is independently a bond, a single bonded O, CO, S, $SO_2$, a substituted or unsubstituted C1 to C30 alkylene group, a substituted or unsubstituted C3 to C30 cycloalkylene group, a substituted or unsubstituted C6 to C30 arylene group, a substituted or unsubstituted C7 to C30 alkylarylene group, a substituted or unsubstituted C1 to C30 heteroalkylene group, a substituted or unsubstituted C2 to C30 heterocycloalkylene group, or a substituted or unsubstituted C2 to C30 alkenylene group.

28. The method of claim 21, wherein the aldehyde compound is terephthalaldehyde.

29. The method of claim 21, wherein the aryl amine is diaminobenzidene, and wherein the aldehyde compound is terephthalaldehyde.

30. The method of claim 15, wherein the method for preparation of a benzimidazole-based aerogel more specifically comprises:
    a. reacting at least one aryl amine having at least four amino groups and at least one aldehyde compound having at least two aldehyde groups in a suitable solvent to form a polybenzimidazole gel precursor solution;
    b. casting the polybenzimidazole gel precursor solution into a fiber reinforcement phase;
    c. allowing the at least one gel precursor in the precursor solution to transition into a gel material;
    d. replacing at least a portion the suitable solvent in the gel material with an alcohol solvent having 1 to 4 carbon atoms; and
    e. drying the gel materials to remove at least a portion of the alcohol solvent to obtain a benzimidazole-based aerogel.

31. The method of claim 30, wherein the aryl amine is diaminobenzidene, and wherein the aldehyde compound is terephthalaldehyde.

32. The method of claim 30, wherein the aerogel is dried using carbon dioxide under supercritical carbon dioxide conditions.

33. The method of claim 30, wherein the aerogel is dried using carbon dioxide under subcritical carbon dioxide conditions.

* * * * *